(12) United States Patent
Zebelloni et al.

(10) Patent No.: US 7,415,544 B2
(45) Date of Patent: Aug. 19, 2008

(54) ARCHITECTURE AND METHOD FOR THE CENTRALISED CONTROL OF REMOTE PERIPHERAL ELECTRONIC DEVICES

(75) Inventors: Paolo Zebelloni, Turin (IT); Maurizio Corino, Turin (IT)

(73) Assignee: C-Labs S.R.L., Turin (IT)

( * ) Notice: Subject to any disclaimer, the term of this patent is extended or adjusted under 35 U.S.C. 154(b) by 397 days.

(21) Appl. No.: 10/522,196

(22) PCT Filed: Jul. 31, 2003

(86) PCT No.: PCT/IB03/03413

§ 371 (c)(1),
(2), (4) Date: Jan. 24, 2005

(87) PCT Pub. No.: WO2004/015647

PCT Pub. Date: Feb. 19, 2004

(65) Prior Publication Data

US 2005/0268118 A1    Dec. 1, 2005

(30) Foreign Application Priority Data

Aug. 2, 2002    (IT)    .................... TO2002A0692

(51) Int. Cl.
*G06F 3/00*    (2006.01)

(52) U.S. Cl. .................... 710/5; 713/320; 713/324; 713/400

(58) Field of Classification Search .................... None
See application file for complete search history.

(56) References Cited

U.S. PATENT DOCUMENTS

| | | | | |
|---|---|---|---|---|
| 5,627,882 | A | * | 5/1997 | Chien et al. .................. 455/464 |
| 5,854,994 | A | * | 12/1998 | Canada et al. .................. 702/56 |
| 2001/0024434 | A1 | * | 9/2001 | Ayyagari et al. ............ 370/347 |
| 2005/0073991 | A1 | * | 4/2005 | Roberts et al. .............. 370/350 |

FOREIGN PATENT DOCUMENTS

GB    2271691 A  *  4/1994

\* cited by examiner

*Primary Examiner*—Alford W. Kindred
*Assistant Examiner*—Eron J Sorrell
(74) *Attorney, Agent, or Firm*—Bacon & Thomas, PLLC

(57) ABSTRACT

Architecture and method for the centralised control of events occurring in correspondence with remote peripheral electronic devices, in particular wireless devices, provided with radio units which are periodically turned on and turned off in order to limit electric power consumption to a minimum, said architecture and said method allowing for the synchronised bi-directional transmission of information between said peripheral devices and a central device.

22 Claims, 8 Drawing Sheets

ARCHITECTURE AND METHOD FOR THE CENTRALISED CONTROL OF REMOTE PERIPHERAL ELECTRONIC DEVICES

BACKGROUND

A. Field

The invention relates to an architecture and a method for the centralised control of events occurring in correspondence with remote peripheral electronic devices.

More specifically, the invention concerns an architecture and a method for the centralised control, of the kind suitable to be employed in all those situations in which a remote control is required for peripheral devices that hardly accessible for example due to their distance or their large number, by means of a central device.

B. Related Art

The invention can be advantageously employed, for instance in the fields of security, of anti-theft systems, and of the remote control of environmental parameters, such as temperature, humidity, pressure, etc., by means of remote sensors.

It is known that architectures where one or more peripheral electronic devices are able to continuously transmit information to a central device are currently employed. for the centralised control of events occurring in correspondence with remote peripheral electronic devices.

The information transmission from the peripheral to the central device takes place by means of a transmitting unit provided in the peripheral device, through cables, optical fibres, infrared rays, laser, etc., or, preferably, radio waves.

In particular applications, where the peripheral devices are located in areas where no power supply is available, devices autonomously supplied by batteries or accumulators are employed. In such conditions, i.e. when the peripheral devices are battery supplied, and anyway in every situation where it is desirable to minimise current consumption in correspondence with peripheral devices, for example in the case when these devices are very large in number, architectures where the radio unit with which the peripheral devices are equipped is intermittently supplied were developed in the past.

As well known, indeed, in the peripheral devices the receiving and transmitting units absorb most of the electric power supplied by the batteries and, consequently, remarkable savings can be achieved by alternating turn-on and turn-off phases of these units, with an outstanding increase in batteries life.

Another reason for reducing to a minimum the turn-on time slots of the radio unit, in particular of the transmitting unit, lies in the fact that the rules currently in force for the utilisation of the frequencies employed in many applications, for example in the field of remote control, security, etc., allow bus occupancy only for short time slots.

WO 01/26069 discloses, for instance, a peripheral device where a sensor, provided with a transmitting and receiving unit, is periodically supplied for receiving a synchronisation signal from the base station and for transmitting in its turn a flow of information. If the base station receives the flow of information from the peripheral device, it sends a confirmation to the peripheral devices, which can consequently deactivate the supply to the sensor.

Nevertheless, an architecture based on the principle disclosed in the above mentioned WO 01/26069 does not allow to modify the operation parameters of the peripheral device. In other words, the peripheral device, once programmed, cannot undergo further remote modifications of its operation parameters, such as the turn-on, turn-off time slots of the sensor, without directly intervening on the device.

This arises from the fact that the autonomous transmission of flows of information from the central devices to the peripheral ones is not envisaged, but only the transmission of confirmation signals of the reception is provided.

In other words, the receiving unit provided in the peripheral devices, though allowing a bi-directional exchange of data, is intended only to receive a confirmation signal.

The need for a direct intervention on the peripheral device in order to perform its programming involves remarkable drawbacks and limitations, in particular in open-field applications, where the peripheral devices are placed at a large distance from one another and they are large in number.

Furthermore, the prior art architectures do not envisage the possibility of providing devices, either peripheral or central, exclusively supplied by battery and consequently provided with receiving and transmitting units that are periodically turned off.

BRIEF SUMMARY OF PREFERRED EMBODIMENT OF THE INVENTION

An object of the present invention is, therefore, to provide an architecture and a method for its operation which allow to manage peripheral devices by means of a central device, in the case when said peripheral devices are provided with receiving and transmitting units the supply of which is periodically interrupted.

Another object of the present invention is to provide an architecture and a method which allow to manage peripheral devices by means of a central device, in the case when both said peripheral devices and said central device are provided with receiving and transmitting units the supply of which is periodically interrupted.

These and other objects of the present invention are achieved by the architecture and the method according to the appended claims.

In many applications, particularly in wireless applications, it is strictly necessary to minimise consumption. In a monodirectional system, in which the peripheral devices are equipped with a transmitting unit only, this result is achieved by limiting transmissions to a minimum, without knowing for sure whether the signalling of an event has been correctly received by the central device. In a bi-directional architecture like the one of the present invention, which is able to assure transmission reception thanks to confirmation strings, the problem arises of supplying the radio apparatus of the peripheral devices also for the reception of programming, configuration data and state settings, as well as of confirmation strings.

Advantageously, according to the invention, the peripheral devices can be managed by means of the central device without the need for local intervention on them.

The receiving and transmitting units of the peripheral devices, being only periodically supplied, will show a low electric power consumption.

Moreover, also the central unit could be supplied by battery and envisage phases in which the receiving and transmitting units are turned off, with a consequent outstanding increase in batteries life.

DESCRIPTION OF THE DRAWINGS

The present invention will now be more specifically described by reference to the attached drawings, wherein.

DETAILED DESCRIPTION OF PREFERRED EMBODIMENTS OF THE INVENTION

Figure 1A:
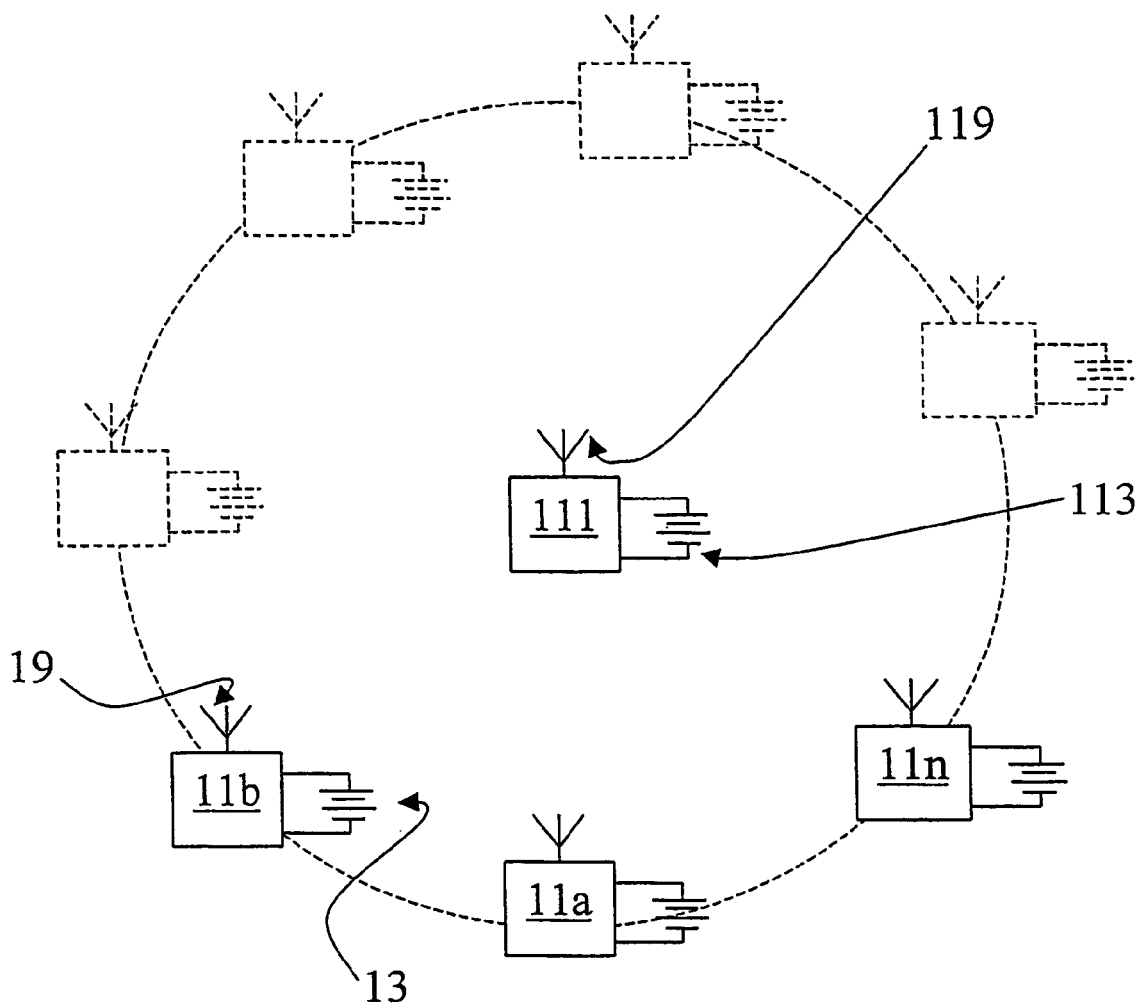
FIG. 1A is a block diagram of the architecture according to a first embodiment of the invention.

With reference to FIG. 1a, the architecture according to a first embodiment of the present invention is schematically explained, which provides a plurality of peripheral devices 11a, 11b, ..., 11n and a central device 111.

According to this preferred embodiment of the invention, the peripheral devices 11a, 11b, ... 11n are wireless devices, that is they have no wire connections, are supplied by batteries 13 and communicate by radio waves through antennas 19.

Similarly, the central device 111 is equipped with an antenna 119 for communicating with the peripheral devices 11a, 11b, ... 11n and is supplied by a battery 113.

Figure 2A:
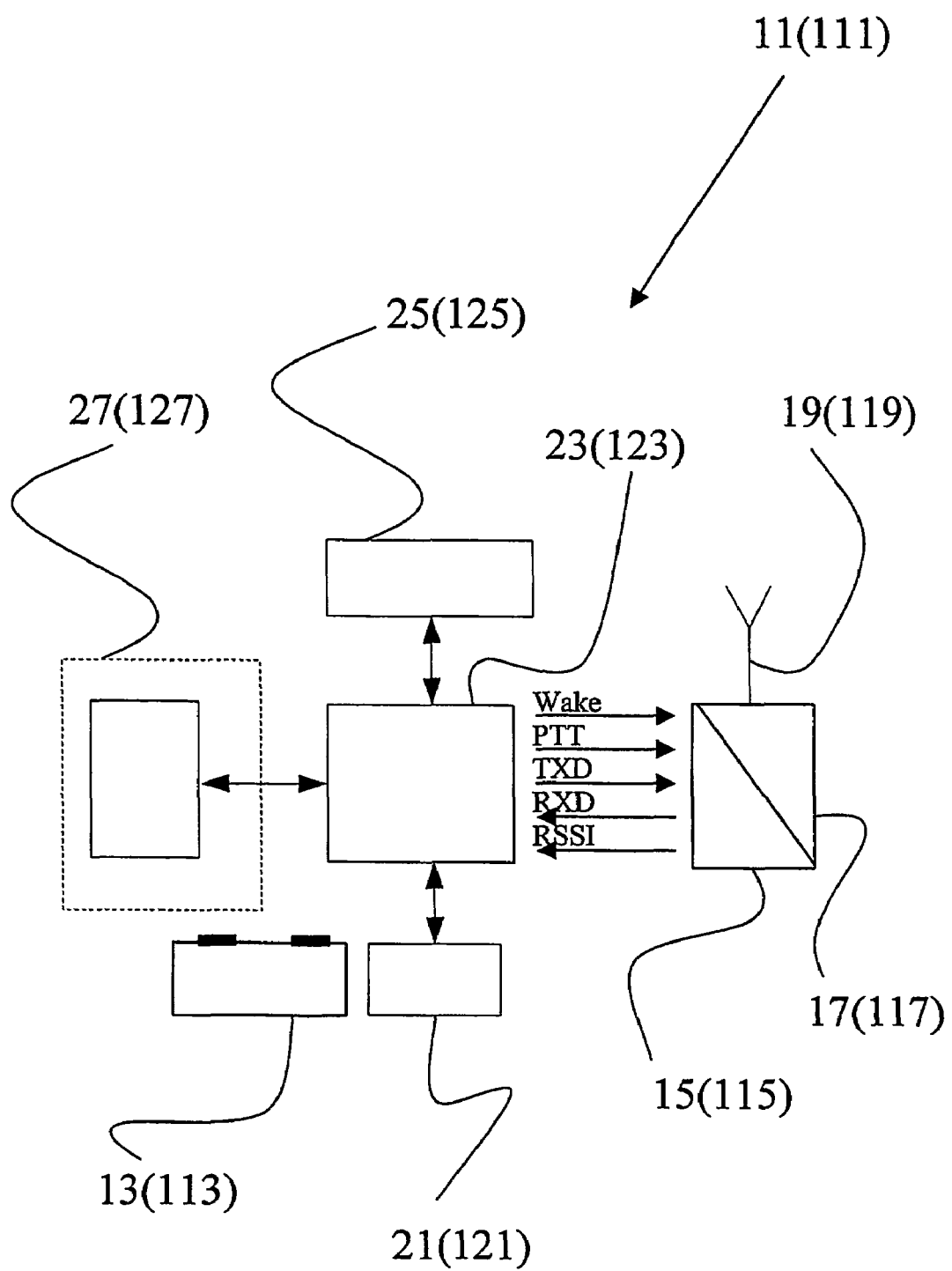
FIG. 2A is a block diagram of a peripheral/central device according to the first embodiment of the invention.
Figure 2B:
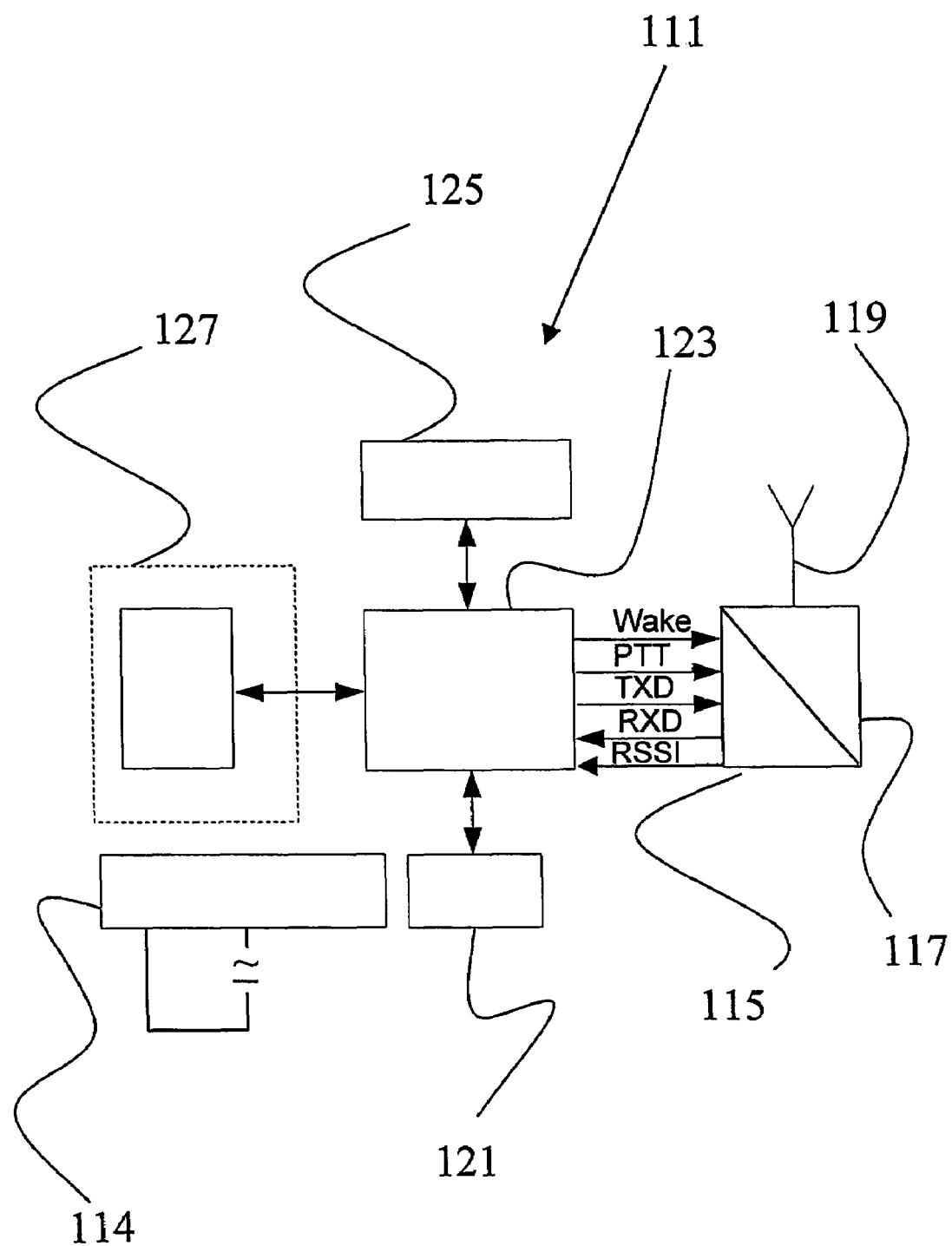
FIG. 2B is a block diagram of a central device according to the second embodiment of the invention.

Referring now to FIG. 2A, the reference numerals of the components of the peripherals devices as well as those (in brackets) of the components of the central device are indicated.

The peripheral devices 11a, 11b, ... 11n (generically indicated by numeral 11) which, as anticipated above, are supplied by a battery 13, communicate from and to the outside by integrated transmitting 15 and receiving 17 radio units, connected to the antenna 19.

Moreover, said peripheral devices 11a, 11b, ... 11n are provided with means 21 for generating a local timing signal $CLK_{loc}$ by which the turn-on and the turn-off of said radio units 15, 17 are periodically controlled.

Said peripheral devices are further provided with a processing unit or CPU 23, which is equipped with storage means 25, either integrated or external, and, optionally, with an I/O gate 27.

Still with reference to FIG. 2A, in this embodiment, the central device 111, which has substantially the same structure as the peripheral devices, is supplied by a battery 113 and communicates from and to the outside by means of a transmitting 115 and receiving 117 radio unit, which are integrated and equipped with an antenna 119.

The central device 111 is further provided with a processing unit or CPU 123, which is equipped with storage means 125, either integrated or external.

The operation of the peripheral devices according to the invention will now be more specifically described.

In the peripheral devices 11a, 11b, ... 11n, the control of the transmitting 15 and receiving 17 unit and of the flow of data from and to the outside is committed to the CPU processing unit 23; moreover, the CPU processing unit 23 manages I/O peripheral devices, if any. In performing out these tasks, the CPU 23 utilises the information and the program steps stored in the storage unit 25.

Said storage unit 25 contains also the operation information and parameters of the peripheral device, such as the time length of the "on" and "off" states of the radio units.

According to the invention, the transmitting 15 and receiving 17 radio unit is controlled by the CPU 23 through the following control signals:

Wake: impose the (ON/OFF) state to the radio unit 15,17;

PTT (Push to Talk): impose the transmitting state to the radio unit 15,17;

TXD: data transmitted by the CPU 23;

RXD: data received by the CPU 23;

RSSI: signal indicating the level of the received radio signal.

Figure 3:
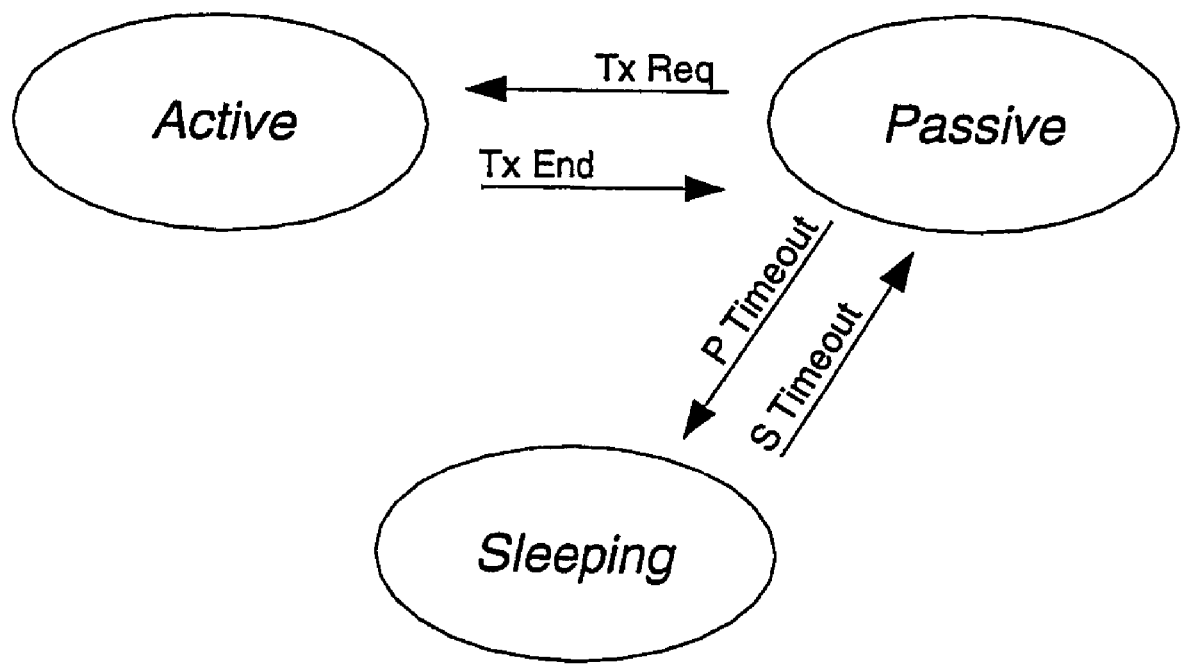
FIG. 3 is a state diagram of the peripheral devices and of the central device when non-continuously supplied.

With reference to FIG. 3, the state of minimal consumption ("sleeping state") in correspondence with the peripheral devices 11a, 11b, ... 11n is achieved by imposing the off state to the transmitting 15 and receiving 17 radio units. In this way, i.e. when in off state, the peripheral device can neither transmit nor receive and the CPU 23 just performs the minimal functions of management of the I/O gates, if any.

Thus, the peripheral device is in the sleeping state.

When the CPU switches over the receiving unit 17 to the ON state ("passive state"), where the peripheral device can receive, but cannot transmit, the electric power consumption rises and the CPU enables the reception and the subsequent processing of data that may come from the receiving unit 17.

When the CPU switches over the transmitting unit 15 to the ON state ("active state"), where said unit 15 can transmit and the CPU 23 enables the transmission of data that may be directed to the transmitting unit 15, the electric power consumption rises further.

The transition from the "sleeping state" to the "passive state" and "active state" is determined by the local timing signal $CLK_{loc}$ and/or by events internal or external to the peripheral device.

In this first embodiment, since the central device 111 is supplied by batteries, it should alternate activity and inactivity phases of the radio unit, in order to reduce consumption to a minimum.

Still with reference to FIG. 3, the main machine states common to the peripheral devices and the central device, as well as the events that can alter said states, are disclosed.

S Timeout switches the machine state from the "sleeping state" to the "passive state", where the peripheral/central device is able to receive through the receiving radio unit 17;

P Timeout switches the machine state to the "sleeping state", where both the transmitting 15 and receiving 17 units are turned off;

Tx Req switches the machine state to the "active state" and coincides with the transmission requests due to either external events (variation on the I/O gates) or internal events (answers to received data or information produced at predetermined time);

Tx End switches the machine state from the "active state" to the "passive state" and coincides with the end of the transmission.

Only the peripheral devices 11a, 11b, ... 11n have also a "sync state", i.e. a time synchrony state where they synchronise with the central device or with a network timing device, if the latter is separated from the central device.

When the peripheral devices are synchronised, they simultaneously switch to the "passive state". If any of the peripheral devices transmits in this time window, the others are able to receive.

It is evident that the synchrony between the different devices gets a remarkable significance for an effective operation of the architecture, since it allows for both the possibility of bi-directional operation, and consequently the information flow from and to the peripheral devices, and maximum consumption reduction.

Figure 4:
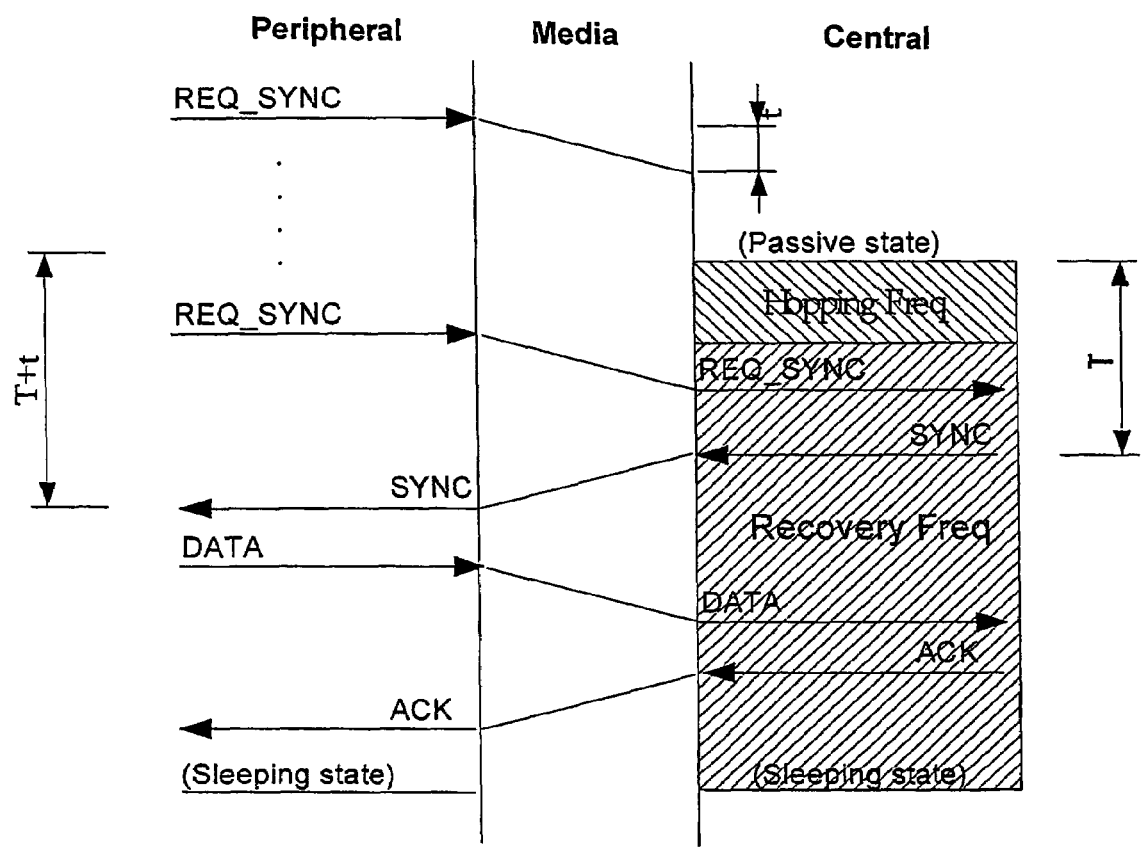
FIG. 4 shows the synchronisation protocol between a peripheral device and the central one.

With reference to FIG. 4, the synchronisation procedure of the peripheral devices is disclosed, wherein:

REQ_SYNC: is the synchronisation request, emitted by the peripheral device that is out of synchrony (generally emitted only once when the peripheral device is turned on for the first time, or when the peripheral device has not received confirmation of the correct reception of transmitted data, which is an indication of lack of synchrony with the central device);

SYNC: is the answer to the synchronisation request REQ_SYNC, emitted by the central device;

DATA: is a generic string of data;

ACK: is a confirmation string.

Still with reference to FIG. 4, a synchronisation session is disclosed, followed by the transmission of a data string, between a peripheral device and a central one. In FIG. 4 and in the following Figures, only the "sleeping states" and the "passive states" are indicated, as the "active sates" are implicitly associated to every data transmission from the peripheral or central device.

In FIG. 4, "t" indicates the media transfer time, intended as time overhead due to serialisation and protocol delays. Since "t" is known and/or can be calculated, it is possible to set up the length of the ON/OFF states of the peripheral and central devices (that is when they switch to the "passive state") in order to preserve synchronisation.

The peripheral device which is out of synchrony switches to the "active state" and repeatedly sends the synchronisation request REQ_SYNC alternating "active states" and passive states" till the central device, which meanwhile has moved to the "passive state", is able to intercept said request.

The central device, once it has received the request REQ_SYNC, switches to the "active state" and sends the synchronisation string SYNC, which can be received by the peripheral device that has sent the request.

The peripheral device that has received the synchronisation string SYNC is therefore able to synchronise its clock with the one of the central device. This is done by the CPU 23 aboard the peripheral device.

On performing synchronisation with the time base of the central device, the peripheral device must consider the media transfer times "t" and the time "T" between the beginning of the "passive state" in the central device and the sending of the string SYNC from said device; the time "t" is calculated by the peripheral device on the basis of the delay of the answer received from the central device, while the time "T" is contained in the synchronisation string sent by the central device.

Thus, the peripheral device, which is now synchronised, can switch to the "active state" and transmit a data string DATA exactly in the time slot when the central device is in the "passive state" and, consequently, is able to receive said string.

The time window during which the central device is in "passive state" and, consequently, is able to listen to the peripheral device is opened at regular intervals and has a length which is dynamically variable depending on the amount of received data.

Once the central device has received the data string, it switches to the "active state" and sends a confirmation string ACK, which is received by the peripheral device.

The synchronisation procedure gets a special significance, for the system operation, since it allows for:

- the possibility of bi-directional operation and consequently the information flow from and to the peripheral devices;
- the minimisation of the consumption levels of the equipment.

Figure 5:
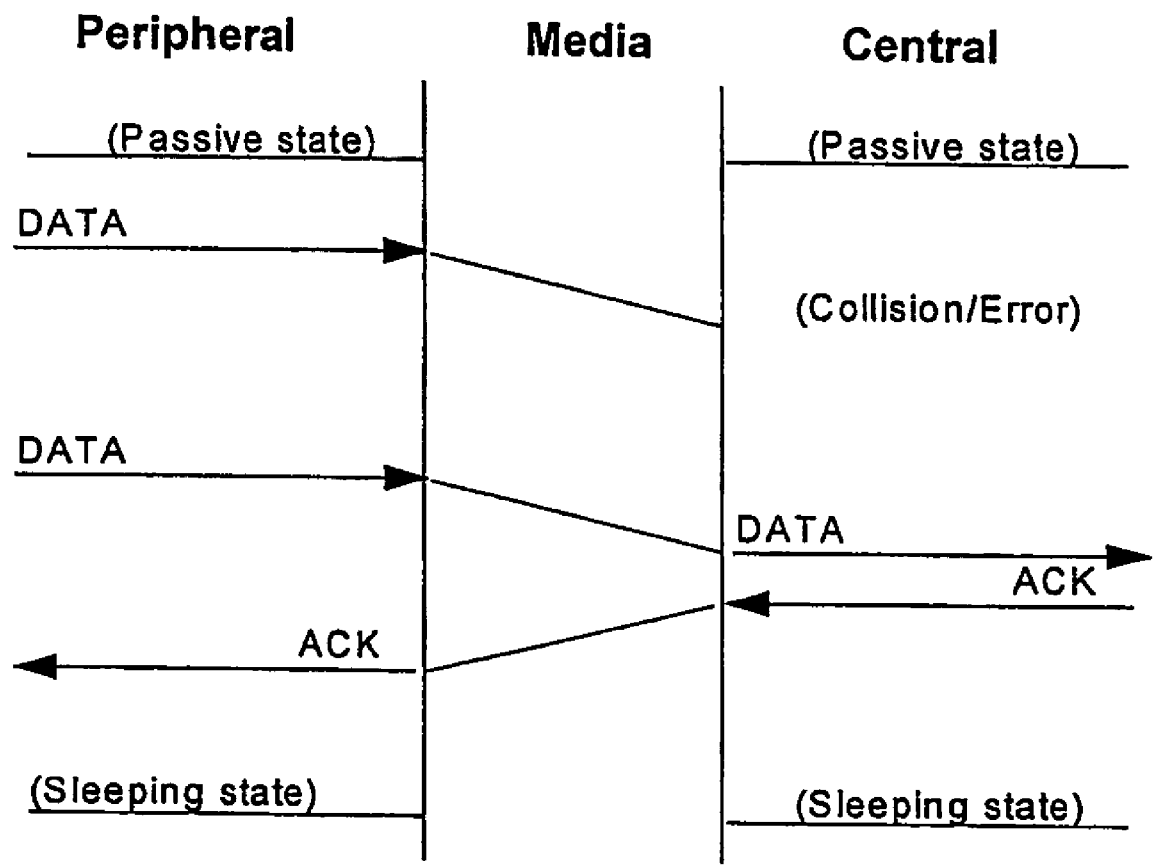
FIG. 5 shows the data transmission protocol from a peripheral device to the central device.

With reference to FIG. 5, the transmission procedure of a generic data string DATA between a peripheral device and a central device is disclosed, the peripheral device being already synchronised with the central one.

The peripheral device, which is in "active state", sends a data string DATA that is received by the central device 11, which is in "passive state", with a delay depending upon the media and upon collision errors that may occur. The central device 111, once it has received the data string DATA, confirms reception by sending a string ACK and, once the peripheral device has received said string, it switches to the "sleeping state".

If the peripheral device does not receive the string ACK in a predetermined time, it will recognise the state of non-synchrony with the central device and the CPU of the peripheral device will perform the synchronisation loop previously disclosed.

It is to be noted that the string ACK preferably contains also the information of synchronisation SYNC, so that the correct synchronisation of the peripheral device with the network time base 121, which is preferably integrated in the central device 111, is restored.

Figure 6:
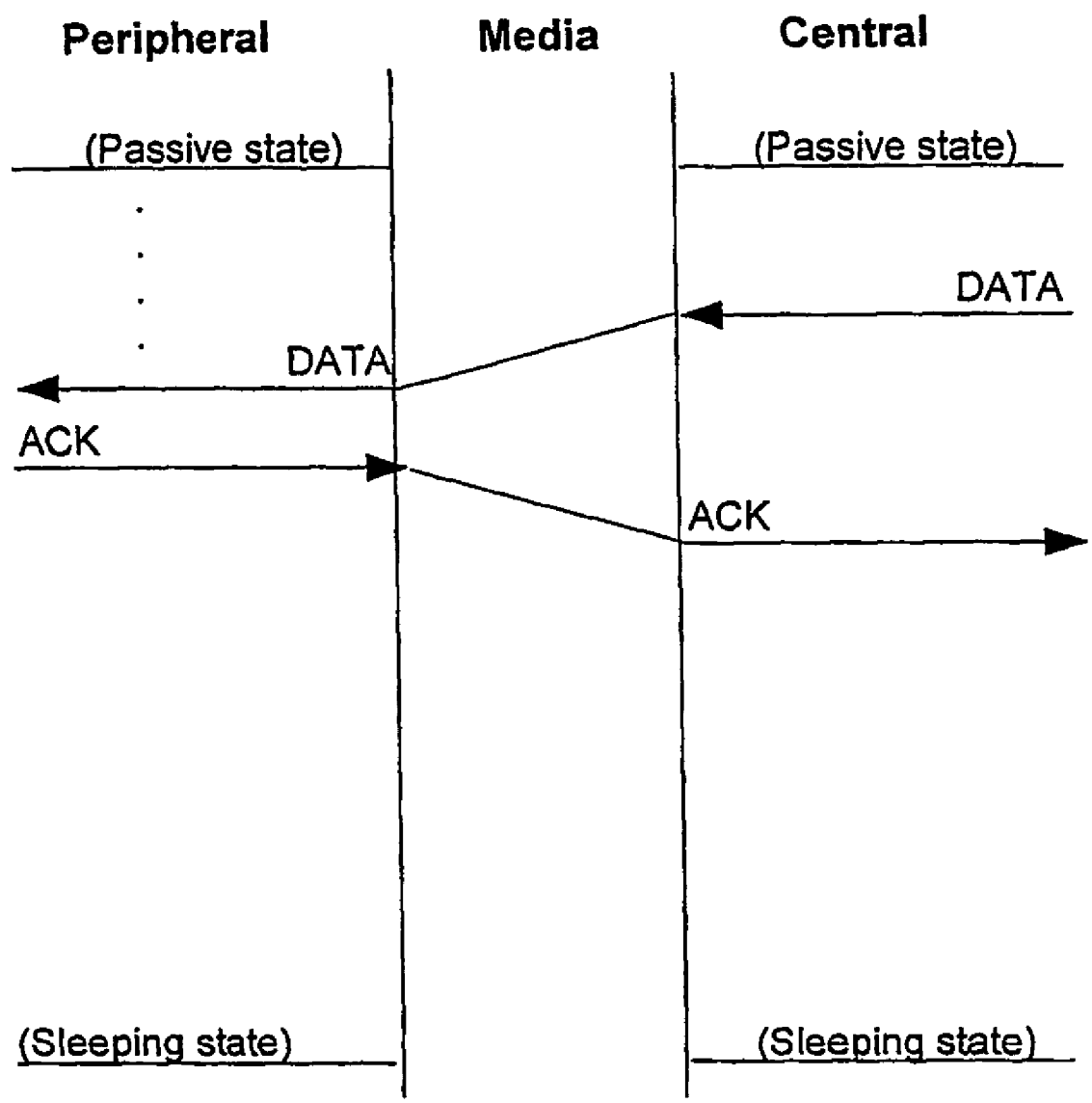
FIG. 6 shows the data transmission protocol from the central device to a peripheral device.

With reference to FIG. 6, the transmission procedure of a generic data string DATA between a central device 111 and a peripheral device 11 is disclosed, the peripheral device 11 being already synchronised with the central one.

The central device 111, which is in "active state", sends a string DATA that is received by the peripheral device 11, which is in "passive state", with a delay depending upon the media and upon collision errors that may occur. The peripheral device 11, once it has received the string DATA, confirms reception by sending a string ACK and, once the central device has received said string, the central device and the peripheral one switch to the "sleeping state".

Figure 1B:
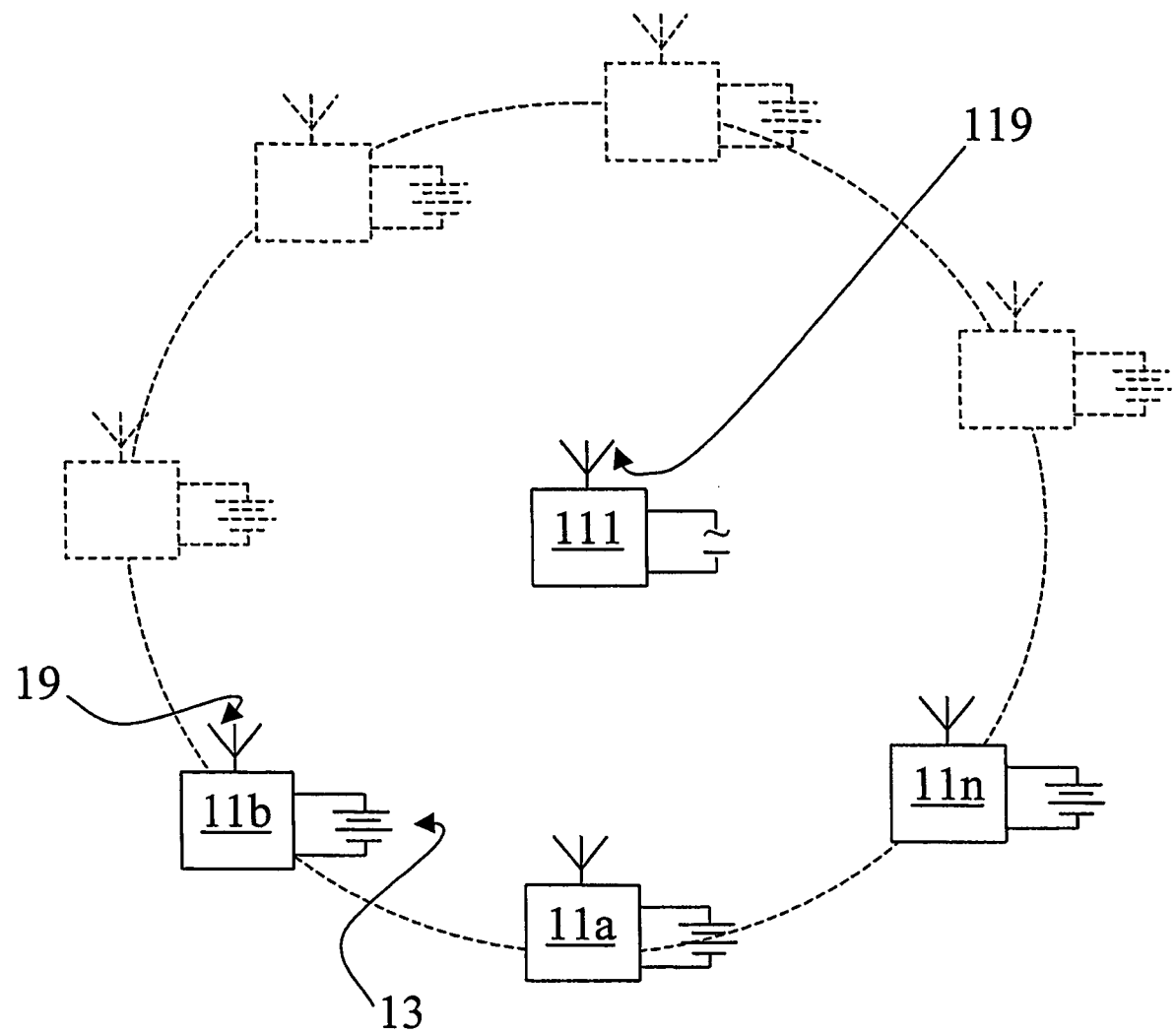
FIG. 1B is a block diagram of the architecture according to a second embodiment of the invention.

With reference to FIG. 1B, the architecture according to a second embodiment of the present invention is schematically disclosed, said architecture involving a plurality of peripheral devices 11a, 11b, ... 11n supplied by battery, like in the first embodiment, but with a central device supplied by the public electric power network.

According to this second embodiment, while the wireless peripheral devices 11a, 11b, ... 11n provide for the turn-on and turn-off of the transmitting 15 and receiving 17 radio unit, the central device 111 does not provide for the turn-off of the receiving unit 117, which consequently is always available for receiving an information flow from the peripheral devices.

Referring again to FIG. 4, a synchronisation session according to a further embodiment of the invention is disclosed, where the peripheral devices 11a, 11b, ... 11n, and the central device 111 are able to communicate at various frequencies, for example, $f_1, f_2, \ldots f_{10}$, which vary according to a sequence fixed by an algorithm common to all the devices, both peripheral and central. For each device, either peripheral or central, the frequency in use at time t will be determined solely on the basis of the frequency in use at the preceding time t−1, according to the relation $f_t = F(t-1)$. This measure, known as frequency hopping, has the advantage of increasing the security of the radio transmissions inside the system on one part and of limiting the occupancy of any single frequency on the other part, according to the prescriptions of the certification rules, yet maintaining the possibility of transmitting for a much longer time.

The synchronisation of the peripheral devices with the central one takes place as follows.

A peripheral device 11a, 11b, ... 11n repeatedly transmits synchronisation requests at a predetermined frequency rf, chosen from the group of available frequencies and defined as Recovery Frequency, for example rf=$f_7$, where $f_7$ is one of ten different frequencies used by the system.

The synchronisation request at frequency rf is received by the central device 111, which periodically opens a listening window on the channel rf, preferably at the end of each passive state.

Once it has received the synchronisation request, the central device 111 transmits a synchronisation string SYNC, which, once received by the peripheral device, enables said device to synchronise with the central device. 111. At the end of this stage, the peripheral device can start the transmission of the data string DATA on one or more frequencies $f_1, \ldots f_{10}$, exactly during the opening of the listening window of the central device, when said device is in passive state.

At the end of the reception of the string DATA, the central device 111 transmits a confirmation string ACK, upon reception of which the peripheral device switches to the "sleeping state".

It is to be noted that in the synchronisation procedure according to this embodiment of the invention, the synchronisation is carried out for the opening times of the reception and transmission windows, as well as for the sequence of the employed frequencies, so that the different devices, both peripheral and central, are able to talk to one another and to be listened to.

The transmission protocol between the peripheral devices and the central one, and vice versa, is of the CSMA (Carrier Sense Multiple Access) type, since possible collisions (simultaneous transmissions) may cause, in general, deterioration of the sent data. Thus, each device carries out transmission attempts until the reception of a confirmation string from the receiver.

Each device randomly shifts, within the limits of an established time window, the time when it switches from the "passive state" to the "active state", thus reducing the chances of collision and of possible successive collisions.

The protocol involves operating strings (such as, for example, synchronisation requests, confirmation strings, network parameters transfer, etc.) and data string, by means of which the state information, events and application commands are transferred.

The strings, independently from their kind and function, contain the following fields:
1. Header: it contains the information on the structure of the string itself;
2. Auxiliary control fields;
3. Variant field;
4. Source and destination addresses;
5. Length;
6. Data field;
7. Control field (CRC);
8. Auto-correction field (for example Reed-Solomon code).

Furthermore, the fields (2) to (7) are preferably ciphered by means of a symmetric algorithm, for example by FEALnX algorithm (64 bit block-cipher), used in CBC (Cipher Block Chaining) mode, and/or with public key.

For the correct operation of the architecture, the fields (1), (4), (5), (6) and (7) are necessary and sufficient, the fields (2), (3) and (8) depending on the application kind and/or to the implementation modes.

The disclosed architecture can be specially applied in all those situations where there is a small traffic of data between the different devices (such as, for example, security systems or wireless environmental monitoring systems), but where, at the same time, bi-directional information flows and low consumption are required.

Moreover, the above disclosed architecture allows to reduce to a minimum the impact on consumption of the bi-directionality of the information flow, within a network of battery supplied equipment, working at a set frequency, or, alternatively, to operate at several frequencies (in a limited set).

In this respect, it will be possible to program peripheral devices for controlling, through the optional I/O gates previously disclosed, the periodical turn-on and turn-off of connected equipment, if any, thus achieving further energy saving.

The architecture and method disclosed were advantageously implemented in laboratory, in a wireless security system comprising the following devices:
a central device, equipped with a keyboard, a graphic display and a telephone interface;
64 passive infrared IR proximity sensors;
5 sirens;
8 electromechanical actuators.

All the devices were supplied by lithium primary batteries and, thanks to the operation modes according to the invention, an endurance typically no lower than 2,5 years in standard conditions of use was estimated, against an endurance of few weeks in a conventional system.

Even if the invention has been disclosed with reference to a wireless radio waves transmission system, it is nevertheless possible to envisage to employ the same architecture in wired systems or in systems using other transmission means, such as laser or infrared rays.

The invention claimed is:

1. Architecture for the centralised control of events occurring in correspondence with remote peripheral electronic devices, comprising:
   at least one electronic central device (111), said electronic central device including a processing unit or CPU (123), a transmitting unit (115), a receiving unit (117) and a power supply unit (114);
   at least a device (121) for generating a network timing signal;
   at least one electronic peripheral device (11a, 11b, . . . 11n), said peripheral device being provided with a processing unit or CPU (23), a storage unit (25), a transmitting unit (15), a receiving unit (17), a device (21) for generating a local timing signal, a battery (13) and means for periodically interrupting and activating the electronic power supply to this transmitting and/or receiving unit,
   wherein said at least one peripheral device (11a, 11b, . . . 11n) is programmable by means of a flow of data autonomously output from said central device and received by said at least one peripheral device;
   wherein said peripheral device (11a, 11b, . . . 11n) is configured to switch over said transmitting and receiving units according to the following machine states:
   "sleeping state," wherein the transmitting and receiving units are not supplied with power;
   "passive state," wherein the receiving unit is supplied with power and the transmitting unit is not supplied with power;
   "active state," wherein both the transmitting and receiving units are supplied with power, and
   wherein said peripheral device comprises means for imposing to said peripheral device a "sync state" where a clock of said peripheral device synchronises by means of a synchronization protocol with said network timing device, when the peripheral device has not received confirmation of the correct reception of transmitted data to the central device, said lack of confirmation being an indication of lack of synchrony with the central device.

2. Architecture according to claim 1, wherein means are provided for enabling the autonomous transfer to said peripheral device from said central device (111) of a flow of information which is received by said receiving unit (17) in said peripheral device (11a, 11b, ... 11n), said means for enabling the autonomous transfer of a flow of information including a synchronisation loop of turn-on and turn-off slots of the transmitting/receiving units (15, 17) of said peripheral device with respect to the network timing signal and a data transfer loop from said central device (111) to said peripheral device (11a, 11b, ... 11n).

3. Architecture according to claim 2, wherein said central device (111) and/or said peripheral device (11a, 11b, ... 11n) periodically switches from the "sleeping state" to the "passive state", the frequency of said switching being determined by a local timing signal and the time length of said "passive state" being determined by said local timing signal and by the reception of data flows by the receiving unit (17).

4. Architecture according to claim 3, wherein said central device and/or said peripheral device periodically switches from the "passive state" to the "active state" and vice versa, the frequency of said switching being determined by the occurrence of an event occurring in correspondence with said central and/or peripheral device and requiring to be transmitted.

5. Architecture according to claim 2, wherein said supply unit of said central device includes a power supply connected to a public or private electric power supply network.

6. Architecture according to claim 1, wherein said peripheral device is a wireless device and wherein said transmitting unit and said receiving unit are a transmitting radio unit and a receiving radio unit, respectively.

7. Architecture according to claim 6, wherein said receiving and transmitting radio units are caused to communicate to each other at varying frequencies belonging to a group of predetermined frequencies chosen according to a sequence which is predetermined and common to all devices, and wherein said synchronisation loop is carried out by utilising always the same recovery frequency (rf) from this group of frequencies.

8. Architecture according to claim 1, wherein said supply unit of said central device and/or of said peripheral device includes a battery.

9. Architecture according to claim 1, wherein said device for generating a network timing signal is integrated in said central device.

10. Architecture according to claim 1, wherein said peripheral device is a sensor of an anti-theft or anti-fire system and wherein said central device is the control unit of said system.

11. Method for the centralised control, by means of at least one electronic central device provided with a processing unit or CPU (123), a transmitting unit (115), a receiving unit (117), a supply unit (114) and by means of a device (121) for generating a network timing signal, of events occurring in correspondence with remote peripheral electronic devices provided with a processing unit or CPU (23), a storage unit (25), a transmitting unit (15), a receiving unit (17), a device (21) for generating a local timing signal, a battery (13) and means for periodically interrupting and activating the electric power supply to this transmitting and/or receiving unit, comprising programming during a phase said at least one peripheral device (11a, 11b, ... 11n) by means of a flow of data autonomously output from said central device and received by said peripheral device;

wherein said peripheral device (11a, 11b, ... 11n) is operable according to the following machine states:

"sleeping state," wherein the transmitting and receiving units are not supplied with power;

"passive state," wherein the receiving unit is supplied with power and the transmitting unit is not supplied with power;

"active state," wherein both the transmitting and receiving units are supplied with power; and wherein said method comprises the steps of:

imposing to said peripheral device a "sync state" where a clock of said peripheral device synchronises by means of a synchronization protocol with said network timing device; and wherein said "sync state" is imposed when the peripheral device has not received confirmation of the correct reception of transmitted data to the central device, said lack of confirmation being an indication of lack of synchrony with the central device.

12. Method according to claim 11, wherein said peripheral device is programmed by means of a first phase of synchronisation of turn-on and turn-off slots of the radio units of said peripheral device with the network timing signal and a second phase during which the data are transferred from said central device to said peripheral device.

13. Method according to claim 12, wherein said synchronisation phase comprises sending, by the peripheral device which is out of synchrony, of a synchronisation request (REQ SYNC), said request being repeated till the reception, by said peripheral device, of an answer (SYNC) emitted by the network timing device.

14. Method according to claim 13, wherein said data flow (DATA) for the programming of said peripheral device is transmitted by said central device when said peripheral device is in "passive state", said peripheral device moving to "active state" at the end of the reception of said data flow, thereby enabling transmittal of a confirmation string (ACK) to said central device.

15. Method according to claim 12, wherein said synchronisation phase comprises sending, by the peripheral device which is out of synchrony, of a synchronisation request (REQ SYNC), said request being always repeated at the same recovery frequency (rf), chosen from a group of frequencies ($f_1$, $f_2$, ... $f_n$) at which said peripheral devices and said central device operate for the data transmission and reception.

16. Method according to claim 11, wherein the transmission protocol from the peripheral devices to the central device and vice versa is of the CSMA (Carrier Sense Multiple Access) type and includes at least a "Header" field, containing the information about the structure of the string itself, a field containing the source and destination addresses, a field containing the string length, a field containing the data and a control field (CRC).

17. Method according to claim 16, wherein said transmission protocol further includes at least an auxiliary control field, a variant field and an auto-correction field.

18. Method according to claim 17, wherein said auto-correction field is coded according to the Reed-Solomon code.

19. Method according to claim 16, wherein at least one of said fields is ciphered by means of a symmetric algorithm.

20. Method according to claim 11, wherein said synchronization protocol comprises the steps of:

switching said peripheral device to said "active state;"

repeatedly sending a synchronization request (REQ_SYNC) alternating "active states" and "passive states" till the central device is able to intercept said request;

once it has received the request (REQ_SYNC), switching said central device to the "active state" and sending a synchronization string (SYNC) to the peripheral device that has sent the request;

receiving said synchronization string (SYNC) in said peripheral device;

synchronizing the clock of said peripheral device with the one of the central device.

21. Method according to claim 20, wherein once the central device has received a data string, it switches to the "active state" and sends a confirmation string ACK to the peripheral device and wherein said string ACK contains also the information of synchronization (SYNC), so that the correct synchronization of the peripheral device with the network time base (121) is maintained.

22. Method according to claim 21, wherein the time window during which the central device is in "passive state" and, consequently, is able to listen to the peripheral device is opened at regular intervals and has a length which is dynamically variable depending on the amount of received data.

* * * * *